(12) United States Patent
Ernst et al.

(10) Patent No.: US 7,879,919 B2
(45) Date of Patent: Feb. 1, 2011

(54) PRODUCTION OF HYDROCARBONS FROM NATURAL GAS

(75) Inventors: Werner Siegfried Ernst, Secunda (ZA); Jacobus Francois Van Tonder, Secunda (ZA)

(73) Assignee: Sasol Technology (Proprietary) Limited, Johannesburg (ZA)

(*) Notice: Subject to any disclaimer, the term of this patent is extended or adjusted under 35 U.S.C. 154(b) by 22 days.

(21) Appl. No.: 12/096,840

(22) PCT Filed: Dec. 12, 2006

(86) PCT No.: PCT/IB2006/054768

§ 371 (c)(1),
(2), (4) Date: Aug. 19, 2008

(87) PCT Pub. No.: WO2007/069197

PCT Pub. Date: Jun. 21, 2007

(65) Prior Publication Data

US 2008/0312347 A1    Dec. 18, 2008

(30) Foreign Application Priority Data

Dec. 15, 2005   (ZA) ............................... 2005/10246

(51) Int. Cl.
   *C07C 27/00*   (2006.01)
(52) U.S. Cl. .................. 518/705; 518/700; 518/702; 518/703; 518/704; 518/706
(58) Field of Classification Search ............ 518/700, 518/702, 703, 704, 705, 706
   See application file for complete search history.

(56) References Cited

U.S. PATENT DOCUMENTS

| 5,763,716 | A | 6/1998 | Benham et al. |
| 6,214,258 | B1* | 4/2001 | Woodward et al. .......... 252/373 |
| 2004/0177646 | A1 | 9/2004 | Wilkinson et al. |
| 2005/0113463 | A1 | 5/2005 | O'Rear et al. |

FOREIGN PATENT DOCUMENTS

| EP | 0979 983 | 2/2000 |
| GB | 2 168 719 | 6/1986 |
| WO | WO 98/50326 | 11/1998 |
| WO | WO 01/10979 | 2/2001 |
| WO | WO 2004/015028 | 2/2004 |

OTHER PUBLICATIONS

PCT Search Report and Written Opinion for PCT/IB2006/054768 dated Sep. 3, 2007.

* cited by examiner

*Primary Examiner*—Jafar Parsa
(74) *Attorney, Agent, or Firm*—Alston & Bird LLP

(57) ABSTRACT

A process for producing hydrocarbons from natural gas includes, in a cryogenic separation stage, cryogenically separating the natural gas to produce at least a methane stream and natural gas liquids, in a reforming stage, reforming the methane stream to produce a synthesis gas which includes at least CO and $H_2$, and in a Fischer-Tropsch hydrocarbon synthesis stage, converting at least some of the CO and $H_2$ into a Fischer-Tropsch product which includes hydrocarbons. A Fischer-Tropsch tail gas which includes at least CO and $H_2$, methane and heavier than methane hydrocarbons, is separated from the Fischer-Tropsch product in a Fischer-Tropsch product separation stage. At least a portion of the Fischer-Tropsch tail gas is recycled to the cryogenic separation stage, where the Fischer-Tropsch tail gas is cryogenically separated into two or more streams.

20 Claims, 1 Drawing Sheet

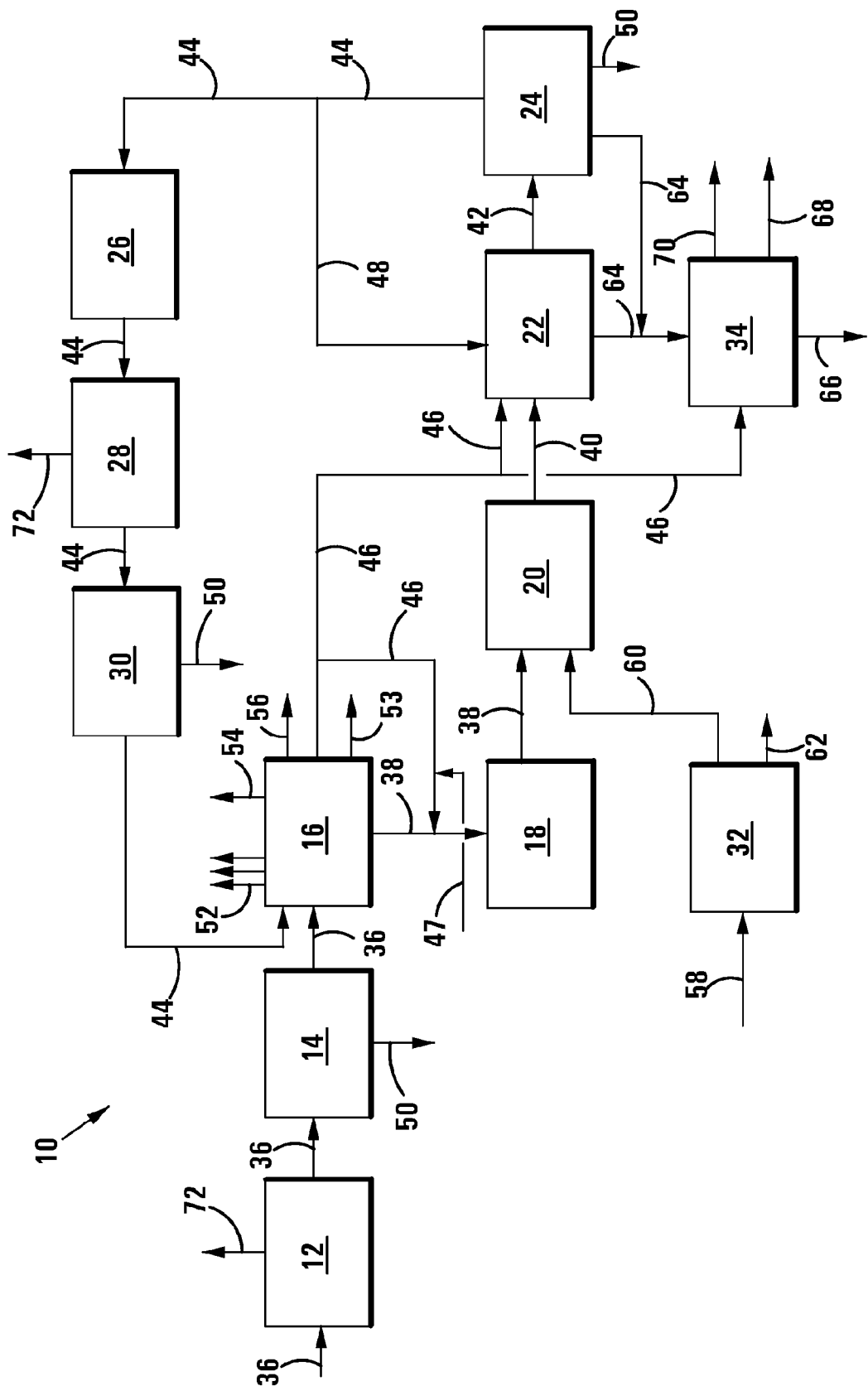

PRODUCTION OF HYDROCARBONS FROM NATURAL GAS

THIS INVENTION relates to the production of hydrocarbons from natural gas. In particular, the invention relates to a process for producing hydrocarbons from natural gas.

According to the invention, there is provided a process for producing hydrocarbons from natural gas, the process including in a cryogenic separation stage, cryogenically separating the natural gas to produce at least a methane stream and natural gas liquids;

in a reforming stage, reforming the methane stream to produce a synthesis gas which includes at least CO and $H_2$;

in a Fischer-Tropsch hydrocarbon synthesis stage, converting at least some of the CO and $H_2$ into a Fischer-Tropsch product which includes hydrocarbons;

in a Fischer-Tropsch product separation stage, separating a Fischer-Tropsch tail gas which includes at least CO and $H_2$, methane and heavier than methane hydrocarbons from the Fischer-Tropsch product; and recycling at least a portion of the Fischer-Tropsch tail gas to the cryogenic separation stage, where the Fischer-Tropsch tail gas is cryogenically separated into two or more streams.

In this specification, the term "natural gas" is intended to include subsurface gas found both in association with crude oil and not associated with crude oil, comprising $CH_4$ as a major component, other hydrocarbons and possibly also non-hydrocarbons such as nitrogen, carbon dioxide and sulphur-containing compounds.

The process typically includes withdrawing liquid and/or gaseous Fischer-Tropsch hydrocarbon products and other gases and vapours from the Fischer-Tropsch hydrocarbon synthesis stage and, in the Fischer-Tropsch product separation stage, cooling the gases and vapours to condense liquid hydrocarbons and water present therein and to produce the Fischer-Tropsch tail gas, which includes unreacted hydrogen and carbon monoxide and light olefins. Typically, the condensed liquid hydrocarbons, reaction water and tail gas are separated in, and withdrawn from, a separator vessel, which is a three-phase separator vessel.

The Fischer-Tropsch tail gas may be cryogenically separated to produce an $H_2$-rich stream. The $H_2$-rich stream from the cryogenic separation stage may include CO.

The cryogenic separation stage may also produce an inert stream, with the inert stream being purged. The inert stream typically includes nitrogen and argon. In some embodiments, argon may be recovered from the inert stream prior to purging the inert stream.

The cryogenic separation stage may produce one or more of an ethylene product stream, a propylene product stream, a butylenes product stream, a pentenes/pentanes and heavier alkenes/alkanes (naphtha) product stream, and a light paraffins stream. Alternatively or in addition, the cryogenic separation stage may produce one or more of a combined $C_2$-product stream containing both ethylene and ethane, a combined $C_3$-product stream containing both propylene and other $C_3$'s, a combined $C_4$-product stream comprising butylene and other $C_4$'s and a naphtha product stream.

The process may include pre-treating the natural gas prior to cryogenically separating the natural gas in the cryogenic separation stage. Pre-treating the natural gas may include drying the natural gas in a drying stage. Typically, this includes cooling the natural gas and knocking out liquid, followed by passing the natural gas through molecular sieves in a temperature swing adsorption cycle.

Pre-treating the natural gas may also include, in a $CO_2$ removal stage, removing $CO_2$ from the natural gas. The $CO_2$ may be removed using an absorbent, e.g. cold methanol (a so-called Rectisol process), potassium carbonate (a so-called Benfield solution), or an amine scrubbing solution, or a combination of these. Instead, the $CO_2$ may be partially removed to a required level using membrane technology or adsorption technology (e.g. pressure swing adsorption).

The cryogenic separation stage may include a plurality of separation units or steps, and the natural gas and the Fischer-Tropsch tail gas may be separately fed to the cryogenic separation stage. The natural gas and the Fischer-Tropsch tail gas may thus be fed to different separation units or steps so that the natural gas and the Fischer-Tropsch tail gas are subjected in the cryogenic separation stage to different separation units or steps as first separation units or steps. While separately feeding the natural gas and the Fischer-Tropsch tail gas is preferred, in some embodiments the natural gas and the Fischer-Tropsch tail gas may instead be combined before the combined gas is fed to the cryogenic separation stage.

The cryogenic separation stage may include separation units or steps employing cooling cycles using light gasses selected from propylene, propane, ethylene, ethane, methane, and/or gas mixtures including any of these light gasses.

The cryogenic separation stage may include a methane wash unit or column, with cooled natural gas, if at a sufficiently high pressure and low temperature, serving as a reflux in the methane wash unit or column, thereby obviating or reducing the need for a separate or integrated methane cooling cycle in the cryogenic separation stage.

The process typically includes an air separation stage to produce oxygen for the reforming stage. A nitrogen stream from the air separation stage may advantageously be employed in the cryogenic separation stage to reduce cooling power requirements in the cryogenic separation stage, i.e. to satisfy some of the cooling duty in the cryogenic separation stage.

Typically, in the cryogenic separation stage, at least a portion of any sulphur species present in the natural gas is removed so that the methane stream may not require further desulphurisation. The process may however include a sulphur removal stage between the inflow of natural gas and the Fischer-Tropsch hydrocarbon synthesis stage, typically between the cryogenic separation stage and the reforming stage. The sulphur removal stage may include a hydrogenation step to convert all the organic sulphur species to $H_2S$, followed by a step in which the $H_2S$ is removed, e.g. by reacting the $H_2S$ with ZnO to form solid ZnS and water vapour. Such a hydrogenation step typically requires a small hydrogen-rich feed.

The reforming stage may be or may include an autothermal reforming stage, a partial oxidation stage, or a combined autothermal reforming stage and a heat exchange reforming stage in which a gas leaving the autothermal reforming stage is used as a heating gas in the heat exchange reforming stage. The heat exchange reforming stage typically is a steam reforming stage, with the heating gas supplying energy required to sustain endothermic steam reforming reactions taking place in the heat exchange reforming stage.

The process may include adjusting the composition of the synthesis gas from the reforming stage. The process may thus include a water gas shift stage through which at least a portion of the synthesis gas is routed, thereby to increase the $H_2$ concentration of the synthesis gas through the water gas shift reaction, particularly when partial oxidation reforming is practised.

The Fischer-Tropsch hydrocarbon synthesis stage may include one or more suitable reactors such as a fluidised bed reactor, a tubular fixed bed reactor, a slurry bed reactor or an ebullating bed reactor. It may even include multiple reactors operating under different conditions. The pressure in the reactors may be between 1 bar and 100 bar, while the temperature may be between 160° C. and 380° C. The reactors will thus contain a Fischer-Tropsch catalyst, which will be in particulate form. The catalyst may contain, as its active catalyst component, Co, Fe, Ni, Ru, Re and/or Rh. The catalyst may be promoted with one or more promoters selected from an alkali metal, V, Cr, Pt, Pd, La, Re, Rh, Ru, Th, Mn, Cu, Mg, K, Na, Ca, Ba, Zn and Zr. The catalyst may be a supported catalyst, in which case the active catalyst component, e.g. Co, is supported on a suitable support such as $Al_2O_3$, $TiO_2$, $SiO_2$, ZnO or a combination of these.

The Fischer-Tropsch hydrocarbon synthesis stage may include one or more low temperature Fischer-Tropsch hydrocarbon synthesis reactors and/or one or more high temperature Fischer-Tropsch hydrocarbon synthesis reactors. Preferably, the Fischer-Tropsch hydrocarbon synthesis stage employs an Fe-based catalyst, which produces a Fischer-Tropsch tail gas with a higher olefin content than other Fischer-Tropsch catalysts such as cobalt-based catalysts. For this same reason, it may also be preferable to use high temperature Fischer-Tropsch hydrocarbon synthesis reactors.

When the Fischer-Tropsch hydrocarbon synthesis stage includes a low temperature Fischer-Tropsch hydrocarbon synthesis reactor, the reactor may operate at a temperature of less than 280° C., typically between 160° C. and 280° C., preferably between 220° C. and 260° C., e.g. about 250° C. The reactor may thus be a high chain growth, typically slurry bed, reactor, operating at a predetermined operating pressure in the range 10-50 bar.

When the Fischer-Tropsch synthesis stage includes a low temperature Fischer-Tropsch hydrocarbon synthesis reactor employing an Fe-based catalyst, the $H_2$:CO ratio of the feed gas to such reactor should be in the range of 0.4 to 2.0, preferably 0.7 to 1.6.

When the Fischer-Tropsch hydrocarbon synthesis stage includes a high temperature Fischer-Tropsch hydrocarbon synthesis reactor, the reactor may operate at a temperature of at least 320° C., typically between 320° C. and 380° C., e.g. about 350° C., and at a predetermined operating pressure in the range 10-50 bar. The reactor may thus be a low chain growth reactor, typically a two-phase fluidised bed reactor.

When the Fischer-Tropsch hydrocarbon synthesis stage includes a high temperature Fischer-Tropsch hydrocarbon synthesis reactor, employing an Fe-based catalyst, the Ribblet number of the synthesis gas being fed to such reactor should be in the range of 0.8-1.1, preferably 0.95-1.05, where the Ribblet number is

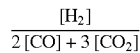

The process may include, in a water gas shift stage downstream of the Fischer-Tropsch hydrocarbon synthesis stage, converting CO in the Fischer-Tropsch tail gas to $CO_2$, producing more $H_2$ which may be recovered in the $H_2$-rich stream from the cryogenic separation stage.

The process may include using the $H_2$-rich stream from the cryogenic separation stage to adjust the composition of the synthesis gas being fed to the one or more Fischer-Tropsch hydrocarbon synthesis reactors of the Fischer-Tropsch hydrocarbon synthesis stage, e.g. to adjust the Ribblet number or the $H_2$:CO ratio of the synthesis gas upwards.

Alternatively or in addition, the process may include, in a water gas shift stage downstream of the reforming stage, converting CO in at least a portion of the synthesis gas from the reforming stage to $CO_2$, producing $H_2$, and optionally removing the $CO_2$, to adjust the composition of the synthesis gas from the reforming stage.

The process may include a product work-up stage in which the Fischer-Tropsch product is worked-up, with a portion of the $H_2$-rich stream from the cryogenic separation stage being fed to the product work-up stage for hydrogenation.

The process may include, in a $CO_2$ removal stage, removing $CO_2$ from the Fischer-Tropsch tail gas before the Fischer-Tropsch tail gas is recycled to the cryogenic separation stage. The $CO_2$ may be removed in the $CO_2$ removal stage using techniques as hereinbefore described.

The light paraffins stream from the cryogenic separation stage may be cracked, e.g. in a steam cracking unit, to produce ethylene and propylene, and unconverted, i.e. uncracked light paraffins and products, i.e. ethylene and propylene, may be separated in the cryogenic separation stage.

The process may include producing an LPG stream in the product work-up stage, and cracking the LPG stream together with the light paraffins stream.

The process may also employ a naphtha cracker to crack naphtha from the cryogenic separation stage and/or from the product work-up stage.

The invention will now be described, by way of example only, with reference to the single accompanying diagrammatic drawing which shows a process in accordance with the invention for producing hydrocarbons from natural gas.

Referring to the drawings, reference numeral 10 generally indicates a process in accordance with the invention for producing hydrocarbons from natural gas or associated gas or the like. The process 10 includes broadly a $CO_2$ removal stage 12, a dehydration stage 14, a cryogenic separation stage 16, a sulphur removal stage 18, a reforming stage 20, a Fischer-Tropsch hydrocarbon synthesis stage 22, a Fischer-Tropsch product separation stage 24, a water gas shift stage 26, a further $CO_2$ removal stage 28, a further dehydration stage 30, an air separation stage 32 and a product work-up stage 34.

A natural gas feed line 36 leads to the $CO_2$ removal stage 12 and from there to the dehydration stage 14 before entering the cryogenic separation stage 16. In the embodiment of the invention shown in the drawing, a methane stream line 38, multiple olefinic products (ethylene, propylene, butylenes) lines 52, a naphtha product line 53, an LPG line 54 and an inerts line 56 as well as an $H_2$-rich stream line 46 all leave the cryogenic separation stage 16.

The methane stream line 38 passes through the sulphur removal stage 18 to the reforming stage 20. From the reforming stage 20 a syngas line 40 leads to the Fischer-Tropsch hydrocarbon synthesis stage 22 and from the Fischer-Tropsch hydrocarbon synthesis stage 22 a Fischer-Tropsch product line 42 leads to the Fischer-Tropsch product separation stage 24.

A Fischer-Tropsch tail gas line 44 leads from the Fischer-Tropsch product separation stage 24 to the water gas shift stage 26, with a Fischer-Tropsch tail gas recycle line 48 branching off and returning to the Fischer-Tropsch hydrocarbon synthesis stage 22. The $H_2$-rich stream line 46 from the cryogenic separation stage 16 leads to the hydrocarbon synthesis stage 22 and also to the product work-up stage 34 and the sulphur removal stage 18. A start-up $H_2$ line 47 joins the branch of the $H_2$ rich stream line 46 feeding the sulphur removal stage 18.

From the water gas shift stage 26 the Fischer-Tropsch tail gas line 44 leads to the $CO_2$ removal stage 28 and from there to the dehydration stage 30 before returning to the cryogenic separation stage 16.

Liquid hydrocarbon products lines 64 lead from the Fischer-Tropsch product separation stage 24 and, in cases where the Fischer-Tropsch synthesis stage 22 includes low temperature Fischer-Tropsch hydrocarbon synthesis reactors, also from the Fischer-Tropsch synthesis stage 22 to the product work-up stage 34, from where a diesel product line 66, a naphtha product line 68 and an LPG product line 70 lead.

An air line 58 leads to the air separation stage 32. An oxygen line 60 leads from the air separation stage 32 to the reforming stage 20. A nitrogen line 62 also leaves the air separation stage 32.

Water lines 50 respectively leave the dehydration stages 14 and 30 and the Fischer-Tropsch product separation stage 24.

$CO_2$ removal lines 72 respectively leave the $CO_2$ removal stage 12 and the $CO_2$ removal stage 28.

The process 10 is used to convert natural gas into valuable hydrocarbons. Natural gas consists primarily of methane, but typically also contains heavier hydrocarbons, water, $CO_2$, nitrogen and sulphur-containing compounds. The natural gas is fed by means of the natural gas feed line 36 to the $CO_2$ removal stage 12 where $CO_2$ is removed from the natural gas feed. Depending on $CO_2$ concentration, it is possible that the $CO_2$ removal stage 12 may be omitted. The $CO_2$ removal stage 12 typically employs an absorption process using cold methanol, potassium carbonate or amine scrubbing or a combination of these. Instead, it may be preferable to remove the $CO_2$ to a desired level using membrane technology only or adsorption technology (e.g. pressure swing adsorption). The removed $CO_2$ is withdrawn from the $CO_2$ removal stage 12 by means of the $CO_2$ removal line 72.

The natural gas is then dehydrated or dried in the dehydration stage 14. Drying is typically done by cooling the natural gas and knocking out condensed water, followed by passing the natural gas through molecular sieves in a temperature swing adsorption cycle.

Dried natural gas is fed to the cryogenic separation stage 16 which typically employs cooling cycles using light gasses selected from propylene, propane, ethylene, ethane, methane, and/or gas mixtures including any of these light gasses cryogenically to cool the natural gas and separate it into a number of streams. In the embodiment of the invention shown in the drawing, the cryogenic separation stage produces a methane stream removed by means of the methane stream line 38, and olefinic products removed by means of the olefinic products lines 52, an LPG product removed by means of the LPG line 54, a naphtha product removed by means of the naphtha line 53 and an $H_2$-rich stream removed by means of the $H_2$-rich stream line 46. Inerts (typically nitrogen and argon) are purged by means of the inerts line 56. In some embodiments, argon may be recovered from the inerts prior to purging.

In a preferred embodiment of the invention, the natural gas, which is typically at a high pressure after cooling, serves as an effective reflux in a methane wash column forming part of the cryogenic separation stage 16. The use of the natural gas as a reflux in the methane wash column obviates or reduces the need for a separate or integrated methane cooling cycle in the cryogenic separation stage 16.

The methane from the cryogenic separation stage 16 may be sufficiently free of sulphur species for further processing. If necessary, however, as shown for the process 10, the methane may be further purified in the sulphur removal stage 18. Typically, the sulphur removal stage 18 includes a hydrogenation step typically operated between 350 to 380° C. in which all of the organic sulphur species are converted to $H_2S$, followed by an $H_2S$ removal step in which the $H_2S$ is reacted with ZnO to form solid ZnS and water, with the solid ZnS being replaced with ZnO from time to time. During sustained operation of the process 10, the hydrogen-rich stream line 46 provides $H_2$ needed for the hydrogenation step. During start-up conditions, $H_2$ needed for the hydrogenation step may be supplied along the start-up hydrogen line 47. Typically the start-up hydrogen line 47 is supplied by a small start-up $H_2$ production unit (not shown).

Desulphurised methane is fed by means of the methane stream lines 38 to the reforming stage 20 which is a conventional reforming stage employing conventional reforming technology, such as autothermal reforming, partial oxidation reforming or a combination of autothermal reforming and heat exchange reforming. When a combination of autothermal reforming and heat exchange reforming is used, a gas leaving an autothermal reforming stage is used as a heating gas in a heat exchange reforming stage. The heat exchange reforming stage typically is a steam reforming stage, with the heating gas supplying energy required to sustain endothermic steam reforming reactions taking place in the heat exchange reforming stage. Air, by means of the air feed line 58, is fed to the air separation stage 32 where the air is compressed and cryogenically separated into oxygen and nitrogen. Nitrogen is removed by means of the nitrogen line 62 and may be used to satisfy at least some of the cooling duty in the cryogenic separation stage 16. The oxygen is fed to the reforming stage 20 by means of the oxygen line 60.

In the reforming stage 20, the methane is reformed to provide a synthesis gas comprising typically at least $CH_4$, CO, $CO_2$, $H_2O$ and $H_2$. Usually, the ratio of oxygen to methane is used to control the temperature in the reforming stage 20 to prevent soot formation.

Syngas from the reforming stage 20 is fed by means of the syngas line 40 to the Fischer-Tropsch hydrocarbon synthesis stage 22, which preferably includes one or more high temperature Fischer-Tropsch hydrocarbon synthesis reactors employing an Fe-based catalyst. If the Fischer-Tropsch hydrocarbon synthesis stage includes high temperature Fe-based Fischer-Tropsch hydrocarbon synthesis reactors, the Ribblet number of the syngas feed to such reactors should be in the range of 0.8 to 1.1, preferably 0.95-1.05. If the Fischer-Tropsch hydrocarbon synthesis stage includes one or more low temperature Fe-based Fischer-Tropsch hydrocarbon synthesis reactors, the $H_2$:CO ratio of the syngas feed to such reactors should be in the range of 0.4 to 2.0, preferably 0.7 to 1.6. In the case of autothermal reforming in the reforming stage 20, this may be achieved by correctly selecting a steam to carbon ratio for the autothermal reforming process and a correct autothermal reforming process outlet temperature. If partial oxidation reforming is employed, it will typically be necessary to employ water gas shift on at least a portion of the syngas from the reforming stage 20 to increase the $H_2$:CO ratio followed by $CO_2$ removal (not shown).

In the Fischer-Tropsch hydrocarbon synthesis stage 22, the syngas is partially converted into hydrocarbons. The operation of a Fischer-Tropsch hydrocarbon synthesis stage in general is well-known and will not be described in any more detail.

At least some Fischer-Tropsch product from the Fischer-Tropsch hydrocarbon synthesis stage 22 is removed by means of the Fischer-Tropsch product line 42 and fed to the Fischer- Tropsch product separation stage 24 where the Fischer-Tropsch product is cooled and separated using a three-phase separator. Liquid hydrocarbon products from the Fischer-Tropsch separation stage 24 and possibly also liquid hydrocarbon products from the Fischer-Tropsch hydrocarbon synthesis stage 22 are removed by means of the liquid hydrocarbon products lines 64 and fed to the product work-up stage 34. Water (reaction water) is withdrawn from the Fischer-Tropsch product separation stage 24 by means of the water line 50.

The Fischer-Tropsch product separation stage 24 produces Fischer-Tropsch tail gas which typically includes unconverted $H_2$ and CO as well as $CO_2$. The Fischer-Tropsch tail gas is fed by means of the Fischer-Tropsch tail gas line 44 to the water gas shift stage 26. A portion of the Fischer-Tropsch tail gas is however recycled to the Fischer-Tropsch hydrocarbon synthesis stage 22 by means of the Fischer-Tropsch tail gas recycle line 48. Hydrogen from the cryogenic separation stage 16 may be fed by means of the $H_2$-rich stream line 46 to enrich the syngas being fed to Fischer-Tropsch hydrocarbon synthesis reactors of the Fischer-Tropsch hydrocarbon synthesis stage 22 in hydrogen, thereby to ensure that either the Ribblet number or $H_2$:CO ratio as the case may be of the synthesis gas being fed to the Fischer-Tropsch hydrocarbon synthesis reactors is within the ranges given above. As is well-known to those skilled in the art, a Fischer-Tropsch hydrocarbon synthesis stage using promoted iron Fischer-Tropsch catalyst suffers from a rapid decline in reaction stage productivity as the per pass conversion of CO and $H_2$ increases. This is especially true in the case of low temperature Fischer-Tropsch synthesis. Recycle of the Fischer-Tropsch tail gas may thus be used to keep the per pass conversion of CO and $H_2$ sufficiently low whilst at the same time ensuring acceptable overall conversion of CO and $H_2$.

In the water gas shift reaction stage 26, all or some of the CO in the Fischer-Tropsch tail gas is converted to $CO_2$ using the well-known water gas shift reaction between CO and $H_2O$ to produce $H_2$ and $CO_2$. In the case where high temperature Fischer-Tropsch reactors are used in the Fischer-Tropsch hydrocarbon synthesis stage 22, the water gas shift reaction stage 26 may be omitted. The Fischer-Tropsch tail gas is then fed to the $CO_2$ removal stage 28 where at least a portion of the $CO_2$ is removed by means of the $CO_2$ removal line 72. The $CO_2$ removal stage 28 may be operated in the same fashion as the $CO_2$ removal stage 12, but given the large volumes of $CO_2$ to be processed, the $CO_2$ removal stage 28 typically employs an absorption process. The Fischer-Tropsch tail gas from the $CO_2$ removal stage 28 is then fed to the dehydration stage 30 where it is cooled and condensed water is separated from the Fischer-Tropsch tail gas and removed by means of the water line 50. The dried Fischer-Tropsch tail gas is then recycled to the cryogenic separation stage 16.

The product work-up stage 34 is used to produce diesel, naphtha and LPG from the liquid hydrocarbon products from the Fischer-Tropsch product separation stage 24 and possibly the Fischer-Tropsch hydrocarbon synthesis stage 22. Hydrogen from the cryogenic separation stage 16 is fed to the product work-up stage 34 by means of the $H_2$-rich stream line 46, for hydrogenation purposes. In the embodiment shown, the hydrogen from the cryogenic separation stage 16 is sufficiently pure to be used directly in the product work-up stage 34. If this is not the case, it may be required to further purify only the hydrogen fed to the product work-up stage 34. Such purification may be done using e.g. adsorbents in a pressure swing adsorption cycle.

The olefinic products produced by the cryogenic separation stage 16 typically include an ethylene product, a propylene product and a butylenes product. The naphtha product produced by the cryogenic separation stage 16 typically comprises pentenes/pentanes and heavier alkenes/alkanes. The LPG produced by the cryogenic separation stage 16 and removed by means of the LPG line 54 typically includes light paraffins and may be used as a fuel gas, sold as an LPG product or it may be routed for optional steam cracking for conversion into ethylene and propylene. The product streams and unconverted reagents from such a steam cracking unit may be returned to the cryogenic separation stage 16 for separation. The different light paraffin fractions may either be treated together, or they may be separated into $C_2$, $C_3$ etc fractions and then treated.

The LPG from the product work-up stage 34 may advantageously also be fed to the steam cracking unit employed to crack the LPG from the cryogenic separation stage 16. In this fashion, the economy of scale of the cryogenic separation stage 16 may be improved. A naphtha cracker may also be employed to similar effect.

When the Fischer-Tropsch hydrocarbon synthesis stage 22 is a low temperature Fischer-Tropsch hydrocarbon synthesis stage, it will typically be necessary to recover additional $H_2$ for product work-up using membrane or pressure swing adsorption technology.

The process 10, as illustrated, exhibits a surprising number of advantages. The amount of olefins in a tail gas from a Fischer-Tropsch hydrocarbon synthesis stage employing low temperature Fischer-Tropsch hydrocarbon synthesis reactors is normally too low and the capital cost of cryogenic separation is too high to warrant recovery. With the process 10 of the invention and employing low temperature Fischer-Tropsch hydrocarbon synthesis, the olefins can economically be recovered from the Fischer-Tropsch tail gas. A favourable economy of scale is achieved for the cryogenic separation and for the production of $C_2$ to $C_4$ hydrocarbons or olefins. Capital requirements and operating costs for the production of synthesis gas are reduced, as it is possible to preheat the methane stream, which is free of heavier hydrocarbons, to a higher temperature before pre-reforming is required and bearing in mind that only methane is to be recycled from the cryogenic separation stage 16 for the production of synthesis gas as $H_2$, CO, inerts and light hydrocarbons are removed from the Fischer-Tropsch tail gas. A higher preheat temperature improves the thermal and carbon efficiency of the reforming step. Purged unconverted reagents that would otherwise have served as fuel gas, are recovered and recycled to the Fischer-Tropsch hydrocarbon synthesis stage. This allows less valuable natural gas or condensates to be used as fuel. A reduced inerts concentration can be achieved in the Fischer-Tropsch tail gas loop resulting in more efficient utilisation of equipment and a potentially improved overall conversion by allowing for higher internal recycle ratios for the Fischer-Tropsch hydrocarbon synthesis stage. Depending on the specific sulphur species present in the natural gas, the cryogenic separation stage 16 may remove a major portion of the sulphur species, thereby reducing the need for sulphur removal upstream of the reforming stage and possibly even the elimination of a need for further sulphur removal in case of Fe catalysed Fischer-Tropsch processes, especially so in the case of high temperature Fischer-Tropsch. The inventors believe that it may well be feasible to remove even the most volatile sulphur species, namely $H_2S$, to a very low level in the cryogenic separation stage, thereby completely eliminating the need for a sulphur removal stage upstream of the reforming stage. This also has the benefit of removing the need for a start-up hydrogen supply unit or source. Advantageously, none of the sulphur species report to the $H_2$-rich stream, with the result that no sulphur removal is required from the $H_2$-rich stream fed to the Fischer-Tropsch hydrocarbon synthesis stage. Lower purity oxygen can be tolerated in the reforming stage 20, since inerts are effectively removed from the methane stream. A larger overall plant size can be achieved for a given oxygen plant size since the synthesis gas generation will require less oxygen in the absence of $C_2^{30}$ hydrocarbons in the feed to the reforming stage 20. CO and methane are close-boiling. Converting all or some of the CO in the Fischer-Tropsch tail gas to $CO_2$ in the water gas shift reaction stage 26, has the advantage that it eliminates or reduces the need to separate methane and CO in the cryogenic separation stage 16.

Cryogenic separation requires a lot of power to drive cooling cycles. A Fischer-Tropsch process utilising stranded gas can produce an excess of power for export but usually has no market for the excess power. The combination of a large cryogenic separation stage coupled to a Fischer-Tropsch hydrocarbon synthesis stage exploits these two features, providing a useful consumer for the available power.

The process 10, as illustrated, can achieve a high overall carbon and thermal efficiency, compared to other Fischer-Tropsch processes of which the Inventors are aware, since virtually all Fischer-Tropsch $C_2^+$ hydrocarbon products can be recovered from the Fischer-Tropsch tail gas instead of being recycled and reformed.

The invention claimed is:

1. A process for producing hydrocarbons from natural gas, the process including
   in a cryogenic separation stage, cryogenically separating the natural gas to produce at least a methane stream and natural gas liquids;
   in a reforming stage, reforming the methane stream to produce a synthesis gas which includes at least CO and $H_2$;
   in a Fischer-Tropsch hydrocarbon synthesis stage, converting at least some of the CO and $H_2$ into a Fischer-Tropsch product which includes hydrocarbons;
   in a Fischer-Tropsch product separation stage, separating a Fischer-Tropsch tail gas which includes at least CO and $H_2$, methane and heavier than methane hydrocarbons from the Fischer-Tropsch product; and
   recycling at least a portion of the Fischer-Tropsch tail gas to the cryogenic separation stage, where the Fischer-Tropsch tail gas is cryogenically separated into two or more streams, the cryogenic separation stage including a methane wash unit or column, with cooled natural gas serving as a reflux in the methane wash unit or column, and with methane recovered from the Fischer-Tropsch tail gas being recycled to the reforming stage for the production of synthesis gas.

2. The process as claimed in claim 1, which includes withdrawing liquid and/or gaseous Fischer-Tropsch hydrocarbon products and other gases and vapours from the Fischer-Tropsch hydrocarbon synthesis stage and, in the Fischer-Tropsch product separation stage, cooling the gases and vapours to condense liquid hydrocarbons and water present therein and to produce the Fischer-Tropsch tail gas, which includes unreacted hydrogen and carbon monoxide and light olefins.

3. The process as claimed in claim 1, in which the Fischer-Tropsch hydrocarbon synthesis stage includes one or more low temperature Fischer-Tropsch hydrocarbon synthesis reactors and/or one or more high temperature Fischer-Tropsch hydrocarbon synthesis reactors.

4. The process as claimed in claim 3, in which the Fischer-Tropsch hydrocarbon synthesis stage employs an Fe-based catalyst.

5. The process as claimed in claim 1, in which the Fischer-Tropsch tail gas is cryogenically separated to produce an $H_2$-rich stream.

6. The process as claimed in claim 5, which includes in a water gas shift stage downstream of the Fischer-Tropsch hydrocarbon synthesis stage, converting CO in the Fischer-Tropsch tail gas to $CO_2$, producing more $H_2$ which is recovered in the $H_2$-rich stream from the cryogenic separation stage.

7. The process as claimed in claim 5, which includes using the $H_2$-rich stream from the cryogenic separation stage to adjust the composition of the synthesis gas being fed to the one or more Fischer-Tropsch hydrocarbon synthesis reactors of the Fischer-Tropsch hydrocarbon synthesis stage.

8. The process as claimed in claim 5, which includes a product work-up stage in which the Fischer-Tropsch product is worked-up, with a portion of the $H_2$-rich stream from the cryogenic separation stage being fed to the product work-up stage for hydrogenation.

9. The process as claimed in claim 1, which includes in a $CO_2$ removal stage, removing $CO_2$ from the Fischer-Tropsch tail gas before the Fischer-Tropsch tail gas is recycled to the cryogenic separation stage.

10. The process as claimed in claim 1, in which the cryogenic separation stage produces an inert stream, with the inert stream being purged.

11. The process as claimed in claim 10, in which argon is recovered from the inert stream prior to purging the inert stream.

12. The process as claimed in claim 1, in which the cryogenic separation stage produces one or more of an ethylene product stream, a propylene product stream, a butylenes product stream, a pentenes/pentanes and heavier alkenes/alkanes (naphtha) product stream, and a light paraffins stream.

13. The process as claimed in claim 12, in which the light paraffins stream from the cryogenic separation stage is cracked to produce ethylene and propylene, and in which unconverted or uncracked light paraffins and products are separated in the cryogenic separation stage.

14. The process as claimed in claim 13, which includes a product work-up stage, and in which an LPG stream is produced in the product work-up stage, with the LPG stream being cracked together with the light paraffins stream.

15. The process as claimed in claim 1, in which the cryogenic separation stage produces one or more of a combined $C_2$-product stream containing both ethylene and ethane, a combined $C_3$-product stream containing both propylene and other $C_3$'s, a combined $C_4$-product stream comprising butylene and other $C_4$'s and a naphtha product stream.

16. The process as claimed in claim 5, in which the $H_2$-rich stream from the cryogenic separation stage includes CO.

17. The process as claimed in claim 1, in which the cryogenic separation stage includes a plurality of separation units or steps, and in which natural gas and the Fischer-Tropsch tail gas are separately fed to the cryogenic separation stage.

18. The process as claimed in claim 17, in which the cryogenic separation stage includes separation units or steps employing cooling cycles using light gasses selected from propylene, propane, ethylene, ethane, methane and/or gas mixtures including any of these light gasses.

19. The process as claimed in claim 1, in which at least a portion of any sulphur species present in the natural gas is removed in the cryogenic separation stage so that the methane stream does not require further desulphurisation.

20. The process as claimed in claim 15, which employs a naphtha cracker to crack naphtha from the cryogenic separation stage.

* * * * *